Nov. 29, 1938.  H. F. MOSSBERG  2,138,067
TELESCOPE SIGHT
Filed May 18, 1937  2 Sheets-Sheet 1
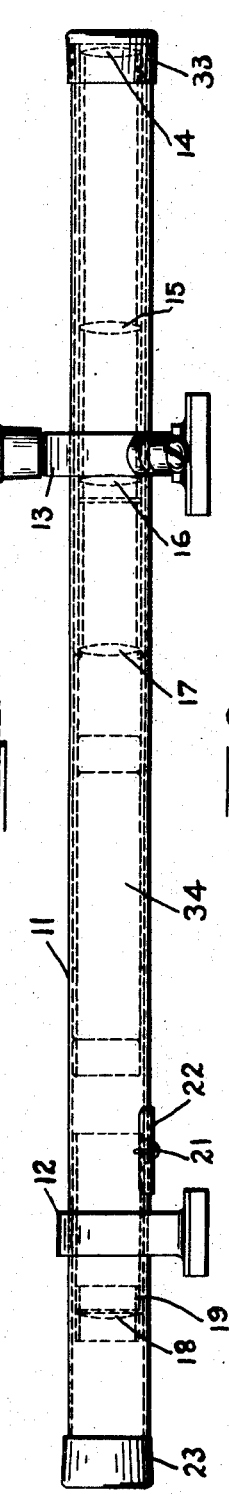
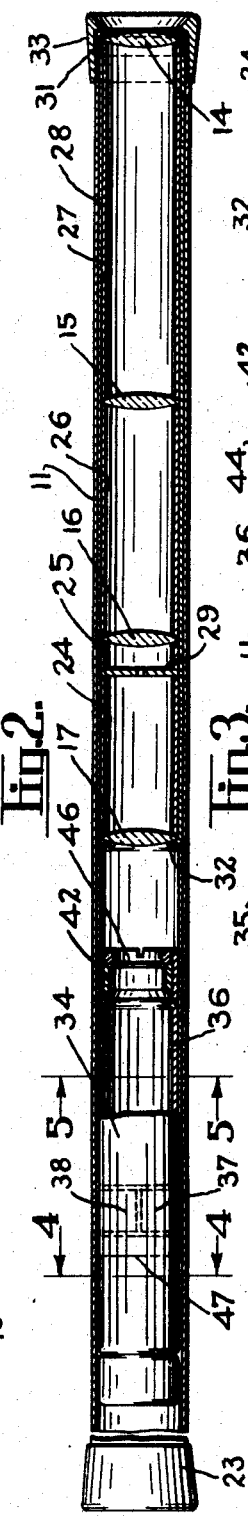
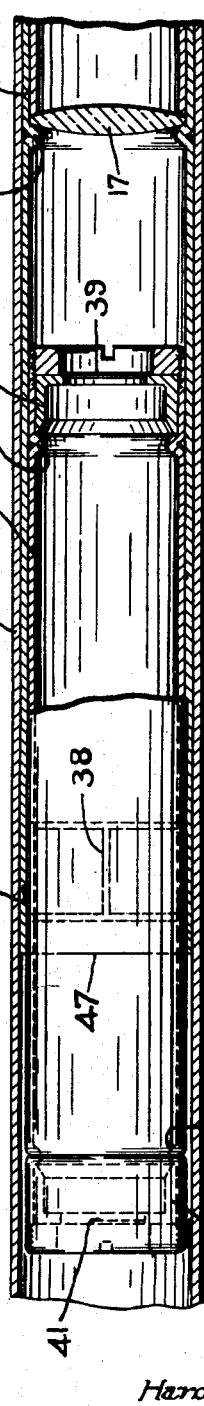
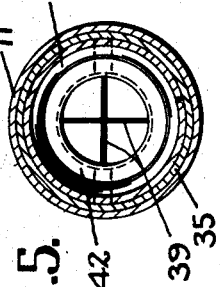
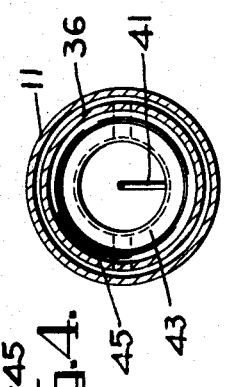
INVENTOR
Harold F. Mossberg.
BY Walter S. Edwards.
ATTORNEY

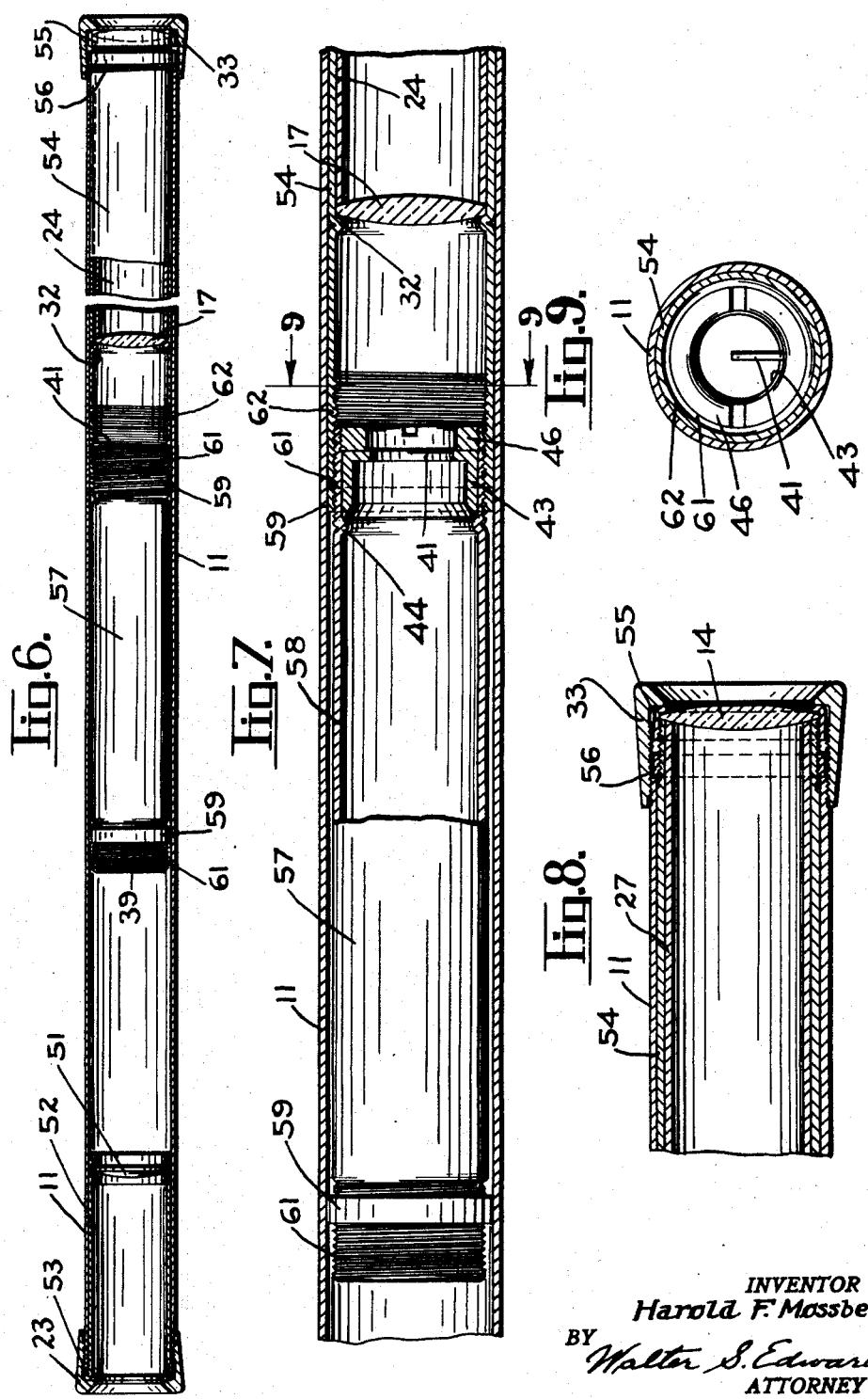

Patented Nov. 29, 1938

2,138,067

UNITED STATES PATENT OFFICE 2,138,067

TELESCOPE SIGHT

Harold F. Mossberg, New Haven, Conn., assignor to O. F. Mossberg & Sons, Inc., New Haven, Conn., a corporation of Connecticut Application May 18, 1937, Serial No. 143,337

10 Claims. (Cl. 88—32)

This invention relates to telescope sights and more particularly to a telescope having in its structure more than one reticule and provision to position any one of the reticules into operative position.

Telescope sights are generally provided with a reticule which is interposed in the telescope tube between the lens holding eye-piece and the objective lens. A cross-hair reticule is generally used, but, when desired for certain classes of shooting, a post reticule is used. In telescope sights as previously constructed, it was necessary to disassemble the telescope to change the reticules from one form to the other, or to replace a broken one, and in so doing, readjustment of the lenses and reticule were required. Such disassembly, readjustment and reassembly were time consuming and laborious. All of the replacement or other reticules of the previous form of telescope sights had to be carried separately, and they were therefore subjected, due to their delicate construction, to possible breakage while being carried and handled.

One of the objects of this invention is to provide an improved form of telescope sight wherein one or more reticules are mounted and carried in a holder, which forms a part of the sight, whereby the necessity of carrying them separately is avoided.

Another object is to provide, in a telescope sight, a holder adapted to carry more than one reticule and to be readily positioned and adjusted to bring any one of the reticules held thereby into operative position and into focus with the lenses of the telescope.

Still another object is to provide a multiple reticule holder for a telescope sight, which is adapted to be reversed, end for end to present any one of the reticules held thereby into substantial operative position in respect to the lenses of the eye-piece of the telescope, and which is further adapted to be adjusted relatively to these lenses to clearly focus the reticule desired and maintain the other reticules out of focus.

A further object is to provide means to positively locate the reticule holder in respect to the lenses of the telescope, after it has been adjusted, to position each of the reticules held thereby into focus, so that no further adjustments are required whenever the holder is subsequently reversed to position the same reticules into operative position.

It is also an object of this invention to provide a telescope sight of generally improved construction, whereby the same will be simple, durable and comparatively inexpensive in construction, as well as convenient, practical, serviceable and efficient in its use.

With the foregoing and other objects in view, which will appear as the description proceeds, the invention resides in the combination and arrangement of parts, and in the details of construction to be hereinafter described and claimed.

Two embodiments of this invention are illustrated in the accompanying drawings, wherein:

Figure 1 is a side view of a telescope sight embodying the features of this invention;

Figure 2 is a broken enlarged longitudinal section of the telescope sight shown in Figure 1;

Figure 3 is a partial longitudinal section, greatly enlarged, of the reticule holder of the improved telescope sight;

Figure 4 is a cross-sectional view taken on line 4—4 of Figure 2;

Figure 5 is a sectional view taken on line 5—5 of Figure 2;

Figure 6 is a broken longitudinal section, of a somewhat modified form of telescope sight;

Figure 7 is a partial longitudinal section, greatly enlarged, of the reticule holder of the telescope shown in Figure 6;

Figure 8 is a broken longitudinal section, greatly enlarged, of the eye-piece or rear end of the same; and Figure 9 is a section view taken on line 9—9 of Figure 7.

The features and principles of this invention are particularly adapted for application to a telescope sight of the form shown in Figure 1, wherein an outer tube 11 is adapted to be adjustably held in frames 12 and 13 in the usual manner and by which the sight is adjusted and secured to the breech end of the barrel of a firearm. A plurality of lenses, such as an eye lens 14, a field lens 15, spaced apart erecting lenses 16, 17 and an objective lens 18 are disposed within the tube 11, the objective lens 18 being suitably held in a tubular holder 19, which is disposed and secured within the forward end of the tube 11 by means of a screw 21. The screw 21 passes through an elongated hole 22 formed in the tube 11 and threadingly engages the rear end of the holder 19 whereby the objective lens 18 may be longitudinally adjusted into focus with the others and secured in place within the tube 11. An end cap 23 is provided and is threadingly mounted upon the forward end of the tube 11.

Referring to Figure 2, the lenses 14–17 inclusive are permanently mounted in proper spaced relation by means of suitable spacing sleeves 24, 25, 26 and 27 within an inner tube 28, and these parts, with a centrally perforated disc 29 disposed between the erecting lenses 16 and 17 and the tube 28 constitute what may be termed the eye-piece unit of the telescope sight. An end cap 31, threadingly secured upon the rear end of the tube 28, firmly holds the lenses and the spacing sleeves together and the lens 17 against an annular rib 32 formed in the tube 28. An end cap 33 is provided and is threadingly mounted upon the rear end of the tube 11 to clamp the cap 31 against the rear end of the tube 11, to secure the eye-piece unit within the tube 11. By this arrangement the eye-piece unit is readily removable in its entirety from the tube 11 without disturbing the relative setting of the lenses 14–17 inclusive. In the form shown in Figures 1–5 inclusive, the objective lens 18 is adjustable relatively to the eye-piece unit longitudinally in the tube 11 by means of the screw 21 and the elongated hole 22.

To form a support for a reticule holder 34, the tube 28 is extended, as at 35, beyond the forward lens 17 and is provided with a pair of inwardly sprung ears 37 and 38, disposed adjacent the forward end of the tube to frictionally engage the tube 36 of the reticule holder 34 and hold it in any position in which it is longitudinally adjusted within the extension 35 of the tube 28, and whereby the holder will be detachably connected to the eye-piece unit and be adapted to be removed simultaneously therewith from the tube 11. Due to the above construction of the holder 34, it may be removed from the extended portion 35 of the tube 28 and reversed end for end after it has been removed, and again inserted into the tube 11 simultaneously with the eye-piece unit, or tube 28.

A reticule is herein shown mounted within each end of the tube 36 of the holder 34 by clamping the crosshair reticule 39 or the post reticule 41 holding sleeves, 42 and 43 respectively, against annular ribs 44 and 45 formed in the tube 36. A clamping bushing 46 threadingly engaged to and within each end of the tube 36 is adapted to abut the respective sleeve 42 or 43 to firmly but removably hold the same securely in place against the ribs 44 or 45. By the above construction and arrangement, either the crosshair reticule 39 or the post reticule 41 may be readily replaced and disposed in operative position relatively to the lenses of the eye-piece unit, and the respective reticule, by means of the ears 37 and 38, may be finely adjusted into clear focus with the lenses and retained in such position. The length of the tube 36 is such, that when the reticule in the end thereof adjacent the lens 17 is in clear focus, the other reticule at the other end of the tube 36 is out of focus and substantially invisible when looking through the eye-piece unit and so that it will not interfere with the use of the reticule disposed in operative position.

The positioning of the desired reticule and its adjustment into focus is made by sighting the combined structure at a light colored object after the connected eye-piece unit and the reticule holder 34 have been removed from the tube 11. When the desired reticule has been axially adjusted in the tube 11 into clear focus, a mark, such as a line 47 may be scratched by a sharp instrument upon the tube 36 at the end of the tube 28. The line 47, by indicating the proper position of the reticule holder 34 to bring either reticule into operative position, insures the quick positioning thereof after it has been once adjusted, it being only necessary to remove, reverse and slide the tube 36 into the extension 35 of the tube 28 up to the line 47. After such adjustment of the reticule holder 34, it, with its carrying tube 28, is replaced into the tube 11 and clamped in place by the end cap 33.

In the form shown in Figures 6–9 inclusive, the objective lens 51 is fixed by being mounted in the rear end of a tube 52. The tube 52 has an end cap 53 threaded on its forward end which is clamped against the forward end of the outer tube 11 by the end cap 23. The eye-piece tube 54 at its rear end is threaded to receive an end cap 55 and an adjusting ring 56. The ring 56 is adapted to adjust the eye-piece tube and with its lenses held thereby relatively to the objective lens 51 by acting as a locating and locking element by its engagement with the rear end of the tube 11. After adjusting the eye-piece unit relatively to the objective lens 51, the end cap 33 is screwed onto the tube 11 and by its engagement with the cap 55 it clamps the ring 56 against the end of the tube 11.

In this latter form, the reticule holder 57, having the cross-hair reticule 39 and the post reticule 41 mounted respectively in its ends as in the previously described form, is provided with threads upon the ends of its tube 58. A locating and adjusting ring 59 is threadingly mounted upon each of the threaded ends 61 of the tube 58. The tube 54 is internally threaded at its forward end 62 to threadingly receive either end of the reticule holder 57. After being screwed into the threaded end 62, to properly focus the desired reticule, the holder 57 is locked in place by the respective ring 59 being clamped against the end of the tube 54. When once located, either reticule can again be positioned by screwing the respective threaded end 61 of the holder 57 into the tube 54 until the locating ring 59 engages the forward end of the tube 54. When one end of the holder 57 is held in the tube 54, the ring 59 at the forward end of the holder 57 engages the interior wall of the tube 11 to steady and support the extending end of the holder. As in the first described form, the eye-piece unit and the reticule holder 57 may be readily removed simultaneously from the tube 11 for adjustment or replacement of the reticule.

By the provision in a telescope sight of the reticule holders described above, either a post or a cross-hair reticule may be quickly and positively replaced and adjustably positioned into focus and, when more than one reticule is carried by the holder, the reticule not in operative position will be substantially invisible when sighting. By the application of the principles of this invention to a telescope sight of the above nature, separate reticules need not be carried by the user with the attendant possibility of their loss or breakage, and the readjustment of the parts of the telescope sight associated therewith, when changing over from one form of reticule to the other, is not required.

It will be understood that the invention may be embodied in other specific forms without departing from the spirit or essential attributes thereof, and it is therefore desired that the present embodiments be considered in all respects as illustrative and not restrictive, and it will be further understood that each and every novel feature and combination present in or possessed by the means herein disclosed forms a part of the invention included in this application.

What is claimed as new and for which it is desired to secure Letters Patent, is:

1. In a telescope sight, a tubular outer casing, an objective lens mounted within and adjacent to one end of said casing, a first tube, carrying a plurality of fixed spaced apart lenses, slidably fitting the bore of and being mounted in said casing to be slidably removable therefrom through the other end thereof, said first tube having a portion extended beyond the innermost one of said lenses carried thereby, a second tube having a sighting reticule held in each of its ends, each end of said second tube slidably fitting the bore of the extended portion of said first tube to adapt it to be readily removed therefrom and reversed end for end to adjustably dispose a selected one of said sighting reticules adjacent the innermost lens in said first tube, and to be slidably adjusted axially relatively to said first tube to focus the selected reticule with the lenses in said first tube, and to connect said second tube within said first tube to be slidably removed from said casing with the first tube for the aforesaid adjustments.

2. In a telescope sight, a tubular outer casing, an objective lens mounted within and adjacent to one end of said casing, a first tube, carrying a plurality of fixed spaced apart lenses, slidably fitting the bore of and being mounted in said casing to be slidably removable therefrom through the other end thereof, said first tube having a portion extended beyond the innermost one of said lenses carried thereby, a second tube having a sighting reticule held in each of its ends, each end of said second tube slidably fitting the bore of the extended portion of said first tube to adapt it to be readily removed therefrom and reversed end for end to adjustably dispose a selected one of said sighting reticules adjacent the innermost lens in said first tube, said second tube being of a determined length to space apart the reticules held thereby to dispose the one of them, which is in the end of said second tube disposed in said extended portion of said first tube, in focus with the lenses in said first tube, and the reticule, which is in the other end of said second tube, out of focus with these same lenses.

3. In a telescope sight, a tubular outer casing, an objective lens mounted within and adjacent to one end of said casing, a first tube, carrying a plurality of fixed spaced apart lenses, slidably fitting the bore of and being mounted in said casing to be slidably removable therefrom through the other end thereof, said first tube having a portion exended beyond the innermost one of said lenses carried thereby, a second tube having a sighting reticule held in each of its ends, each end of said second tube slidingly fitting the bore of the extended portion of said first tube to adapt it to be readily removed therefrom and reversed end for end to adjustably dispose a selected one of said sighting reticules adjacent the innermost lens in said first tube, and to be slidably adjusted axially relatively to said first tube to focus the selected reticule with the lenses in said first tube, and tongues formed in the extended portion on said first tube, said tongues being spring tensioned to engage the end of said second tube within said extended portion and frictionally hold said second tube in its adjusted position relatively to said first tube and to connect said tubes together for simultaneous removal from said casing.

4. In a telescope sight, a tubular outer casing, an objective lens mounted within and adjacent to one end of said casing, a first tube, carrying a plurality of fixed spaced apart lenses, slidably fitting the bore of and being mounted in said casing to be slidably removable therefrom through the other end thereof, said first tube having a portion extended beyond the innermost one of said lenses carried thereby, a second tube having a sighting reticule held in each of its ends, each end of said second tube slidingly fitting the bore of the extended portion of said first tube to adapt it to be readily removed therefrom and reversed end for end to adjustably dispose a selected one of said sighting reticules adjacent the innermost lens in said first tube, and to be slidably adjusted axially relatively to said first tube to focus the selected reticule with the lenses in said first tube, said second tube being of a determined length to space apart the reticules held thereby to dispose the one of them, which is in the end of said second tube disposed in said extended portion of said first tube, in focus with the lenses in said first tube, and the reticule, which is in the other end of said second tube, out of focus with these same lenses, and tongues formed in the extended portion of said first tube, said tongues being spring tensioned to engage the end of said second tube within said extended portion and frictionally hold said second tube in its adjusted position relatively to said first tube and to connect said tubes together for simultaneous removal from said casing.

5. In a telescope sight, a tubular outer casing, an objective lens mounted within and adjacent the front end of said casing, a first tube, carrying a plurality of fixed axially spaced apart lenses, slidably mounted in the bore of said casing to be readily removed therefrom through its rear end, said first tube having a portion extending therefrom toward said objective lens, a second tube having a sighting reticule in each of its ends, each end of said second tube being formed to enter the extended portion of said first tube to be readily and axially removed therefrom to be reversed end for end to adjustably dispose a selected one of said reticules adjacent the innermost one of said lenses in said first tube, the end of said second tube in said extended portion being axially adjustable relatively thereto to focus the selected reticule therein with the lenses in said first tube, and co-operating means between said tubes to connect them to insure their simultaneous removal from said casing for the aforesaid adjustment of said second tube in the extended portion of said first tube.

6. In a telescope sight, a tubular outer casing, an objective lens mounted within and adjacent the front end of said casing, a first tube, carrying a plurality of fixed axially spaced apart lenses, slidably mounted in the bore of said casing to be readily removed therefrom through its rear end, said first tube having a portion extending therefrom toward said objective lens, a second tube having a sighting reticule in each of its ends, each end of said second tube being threaded and said extended portion of said first tube having a threaded bore to threadingly receive said threaded ends of said second tube whereby said second tube is adapted to be readily and axially removed from said first tube to be reversed end for end to dispose a selected one of said reticules adjacent the innermost lens in said first tube and adjustable axially to focus the selected reticule therein with the lenses in said first tube.

7. In a telescope sight, a tubular outer casing, an objective lens mounted within and adjacent the front end of said casing, a first tube, carrying a plurality of fixed axially spaced apart lenses, slidably mounted in the bore of said casing to be readily removed therefrom through its rear end, said first tube having a portion extending therefrom toward said objective lens, a second tube having a sighting reticule in each of its ends, each end of said second tube being threaded and said extended portion of said first tube having a threaded bore to threadingly receive said threaded ends of said second tube whereby said second tube is adapted to be readily and axially removed from said first tube to be reversed end for end to dispose a selected one of said reticules adjacent the innermost lens in said first tube and adjustable axially to focus the selected reticule therein with the lenses in said first tube, and an internally threaded ring screwed on to each threaded end of said second tube to limit the axial movement of the end thereof, received by said first tube, relatively thereto.

8. In a telescope sight, a tubular outer casing, an objective lens mounted within and adjacent the front end of said casing, a first tube, carrying a plurality of fixed axially spaced apart lenses, slidably mounted in the bore of said casing to be readily removed therefrom through its rear end, said first tube having a portion extending therefrom toward said objective lens, a second tube having a sighting reticule in each of its ends, each end of said second tube being threaded and said extended portion of said first tube having a threaded bore to threadingly receive said threaded ends of said second tube whereby said second tube is adapted to be readily and axially removed from said first tube to be reversed end for end to dispose a selected one of said reticules adjacent the innermost lens in said first tube and adjustable axially to focus the selected reticule therein with the lenses in said first tube, and an internally threaded ring screwed on to each threaded end of said second tube to limit the axial movement of the end thereof, received by said first tube, relatively thereto, both of said rings slidingly fitting the bore of said casing, whereby the end of the second tube remote from said first tube will be supported by, spaced from, and with its axis in alignment with, the axis of said casing.

9. In a telescope sight, a tubular outer casing, an objective lens mounted within and adjacent one end of said casing, a first tube, carrying a plurality of fixed spaced apart eye, field, and two erecting lenses respectively in the order named, slidably fitting the bore of said casing to be readily and axially removed therefrom through one end thereof, said first tube having a portion extending axially therefrom beyond the last named erecting lens carried thereby, a second tube having a post reticule in one end and a cross hair reticule in its other end, each end of said second tube being formed to axially enter the extended portion of said first tube to be supported thereby and to be readily and axially removed therefrom to be reversed end for end to adjustably dispose a selected one of said reticules adjacent the last named erecting lens in said first tube, and to be adjusted axially relatively thereto to focus the selected reticule with the lenses in said first tube, and means between said tubes to connect hem together whereby said first and second tubes will be simultaneously removed from said casing for the aforesaid adjustments.

10. In a telescope sight, a tubular outer casing, an objective lens mounted within and adjacent one end of said casing, a first tube carrying a plurality of fixed spaced apart eye, field, and two erecting lenses respectively in the order named, slidably fitting the bore of said casing to be readily and axially removed therefrom through one end thereof, said first tube having a portion extending axially therefrom beyond the last named erecting lens carried thereby, said extending portion having internal screw threads formed therein, a second tube having a post reticule in one end and a cross-hair reticule in its other end, each end of said second tube being threaded to fit the internal threads in said extended portion to be connected thereto to be removed from the casing therewith, and readily removed axially from the extended portion to be reversed end for end to adjustably dispose a selected one of said reticules adjacent the last named erecting lens in said first tube, and to be adjusted axially relatively thereto to focus the selected reticule with the lenses in said first tube, and a threaded ring on each end of said second tube to be axially adjusted thereon and to engage the outer end of said extended portion to adjustably limit the axial movement of said second tube into said extended portion.

HAROLD F. MOSSBERG.